(12) United States Patent
Kim et al.

(10) Patent No.: US 6,516,148 B1
(45) Date of Patent: Feb. 4, 2003

(54) BARREL ASSEMBLY OF ZOOM CAMERA

(75) Inventors: Sung-tae Kim, Changwon (KR);
Sung-wook Choi, Changwon (KR);
Nae-jin Jo, Changwon (KR)

(73) Assignee: Samsung Techwin Co., Ltd.,
Kyongsangnam-do (KR)

( * ) Notice: Subject to any disclaimer, the term of this patent is extended or adjusted under 35 U.S.C. 154(b) by 35 days.

(21) Appl. No.: 09/672,013

(22) Filed: Sep. 29, 2000

(30) Foreign Application Priority Data

Oct. 2, 1999 (KR) ............................................. 99-42527

(51) Int. Cl.[7] .............................. G03B 7/00; G02B 15/14
(52) U.S. Cl. ..................... 396/72; 359/676; 359/694; 359/699; 359/700; 359/701
(58) Field of Search .......................... 396/72; 359/694, 359/695, 696, 697, 698, 699, 700, 701, 676

(56) References Cited

U.S. PATENT DOCUMENTS 5,543,971 A * 8/1996 Nomura ...................... 359/697
5,818,647 A * 10/1998 Nishio et al. ............... 359/700

* cited by examiner

*Primary Examiner*—David M. Gray
*Assistant Examiner*—Rochelle Blackman
(74) *Attorney, Agent, or Firm*—Finnegan, Henderson, Farabow, Garrett, & Dunner LLP (57) ABSTRACT

A barrel assembly of a zoom camera includes a zoom ring at which a front lens group is installed and which is moved back and forth along the optical axis, a rear lens group frame at which a rear lens group is installed along the same optical axis as the front lens group and which is coupled to the zoom ring, and a cam means for correcting the optical position of the rear lens group with respect to the front lens group during operation of zoom.

26 Claims, 5 Drawing Sheets

BARREL ASSEMBLY OF ZOOM CAMERA

BACKGROUND OF THE INVENTION

1. Field of the Invention

The present invention relates to a zoom camera, and more particularly, to a barrel assembly of a zoom camera having a linear trace of zoom.

2. Description of the Related Art

A zoom lens in a camera is used to take photographs by changing a focal distance within a particular range to change the magnification ratio of an image. Also, the zoom lens refers a lens structure enabling variable-focal length.

The zoom lens includes a front lens group mainly having positive power and a rear lens group mainly having negative power. By relatively moving the lens groups, the distance between the lens groups and the distance between the lens groups and the surface of a film fixed to a body of a camera are adjusted so that zoom is performed.

A conventional zoom lens includes two screw shafts for moving lens groups and a power switching mechanism. According to the structure of the zoom lens, each of the lens groups is moved by rotation of the respective screw shafts to perform zoom. When the zoom operation is completed, only one screw is driven by the power switching mechanism to move a lens to complete focusing. However, in the above zoom lens structure, the distance that a zoom lens moves increases to obtain a high power and the structure of the power switch mechanism is complicated. Accordingly, since a space for installation of the zoom lens is needed, it is difficult to make a camera to be compact.

In another structure of a zoom lens, a cam barrel is coupled to a fixed barrel which is fixed to a body of a camera. A front lens group moves linearly with respect to the cam barrel and the rear lens group moves non-linearly while rotating along a cam groove formed on an inner circumferential surface of the cam barrel. Accordingly, the front group lens moves linearly while the rear group lens moves non-linearly, thus performing a zoom operation.

In this case, focusing is performed as the front group lens is moved by a motor installed at a shutter block. However, the processing of the cam barrel is difficult and the structure of a barrel assembly of a zoom camera is complicated. Thus, a zoom lens which enables a camera to have a high power and in a compact size and in which a point where a cam curve changes is not generated when the lens groups move, is requested.

SUMMARY OF THE INVENTION

To solve the above problems, it is an objective of the present invention to provide a barrel assembly of a zoom camera which prevents an unsmooth zoom operation due to overload of a cam when the zoom operation is performed at the curve changing point as the front and rear lens groups are linearly moved, and which can reduce defectiveness in the zoom operation generated due to a process error and an assembly error.

Accordingly, to achieve the above objective, there is provided a barrel assembly of a zoom camera comprising a zoom ring at which a front lens group is installed and which is moved back and forth along the optical axis, a rear lens group frame at which a rear lens group is installed along the same optical axis as the front lens group and which is coupled to the zoom ring, and a cam means for correcting the optical position of the rear lens group with respect to the front lens group during operation of zoom.

Also, to achieve the above objective, there is provided a barrel assembly of a zoom camera comprising a zoom ring at which a front lens group is installed and which is moved back and forth along the optical axis, a rear lens group frame at which a rear lens group is installed along the same optical axis as the front lens group and which is coupled to the zoom ring, a cam means for correcting the optical position of the rear lens group with respect to the front lens group during operation of zoom, the cam means comprising an inner rotator rotatably coupled to the zoom ring and a cam protrusion formed on the inner circumferential surface of the inner rotator which is coupled to a cam groove formed on the outer circumferential surface of the rear lens group frame, an inner guide ring for preventing rotation of the zoom ring and the rear lens group frame when the inner rotator rotates, and a driving means for rotating the inner rotator in forward and reverse directions.

Also, to achieve the above objective, there is provided a A barrel assembly of a zoom camera comprising a fixed barrel fixed to a main body of the zoom camera, a driving means installed at one side of the fixed barrel, a helicoid ring coupled to the fixed barrel by a first reciprocating means so as to be reciprocated according to the rotation of the driving means in forward and reverse directions, a guide ring coupled to the helicoid ring and linearly moved together with the helicoid ring by the first guide means along the optical axis with respect to the fixed barrel when the helicoid ring is moved back and forth, an inner helicoid ring coupled to a second reciprocating means by being inserted in the guide ring, reciprocated by a transfer force of the guide ring by the second guide means, and rotating at the same frequency as the helicoid ring, a zoom ring coupled to the inner helicoid ring by a fourth reciprocating means and where a front lens group is installed, an inner rotator coupled to the zoom ring and rotating together with the inner helicoid ring by a third guide means, a rear lens group frame, where a rear lens group is installed, coupled to the inner rotator and reciprocated by a rotational force of the inner rotator by being guided by a cam means, and an inner guide ring, supported by the guide ring, for prevent the rotation of the rear lens group frame and the zoom ring so that the zoom ring and the rear lens group frame can linearly move during the zoom operation of the front and rear lens groups.

Also, to achieve the above objective, there is provided a A barrel assembly of a zoom camera comprising a fixed barrel fixed to a main body of the zoom camera and having a first guide groove formed on the inner circumferential surface along the optical axis, a driving means installed at one side of the fixed barrel, a helicoid ring coupled to the fixed barrel by a first reciprocating means so as to be reciprocated according to the rotation of the driving means in forward and reverse directions and having a second guide groove along the optical axis, a guide ring coupled to the helicoid ring and having a first cam groove formed on the outer circumferential surface thereof and a first guide protrusion formed at one end portion thereof to be coupled to the first guide groove, the guide ring being linearly reciprocated along the optical axis with respect to the fixed barrel when the helicoid ring is rotated in forward and reverse directions, an inner helicoid ring coupled to the guide ring and a third reciprocating means and having a second guide protrusion formed on the outer circumferential surface thereof to be coupled to the second guide groove through the first cam groove, a zoom ring coupled to the inner helicoid ring by a fourth reciprocating means and where a front lens group is installed, an inner rotator coupled to the zoom ring and having a third guide protrusion formed on the outer circumferential surface thereof which is coupled to a third guide groove formed on the inner circumferential surface of the inner helicoid ring and a cam protrusion formed on the inner circumferential surface thereof, a rear lens group frame where a rear lens group is installed, and having a cam groove formed on the outer circumferential surface thereof which is coupled to the cam protrusion, and an inner guide ring, supported by the guide ring, for prevent the rotation of the rear lens group frame and the zoom ring so that the zoom ring and the rear lens group frame can linearly move along the optical axis by a rotational force of the helicoid ring.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

A barrel assembly of a zoom camera according to a preferred embodiment of the present invention for performing zoom by relatively moving a front lens group and a rear lens group, includes a zoom ring moving back and forth along the optical axis, at which the front lens group is installed, a rear lens group frame coupled to the zoom ring, at which the rear lens group arranged on the same optical axis as the rear lens group is installed, a cam means for correcting the optical position of the rear lens group with respect to the front lens group during a zoom operation, and a driving means for driving the cam means to move the rear lens group frame back and forth with respect to the front lens group.

FIGS. 1 through 6 show a barrel assembly of a zoom camera for correcting the optical position of the rear lens group by relatively moving the front and rear lens groups according to a preferred embodiment of present invention.

As shown in the drawings, a barrel assembly 10 of a zoom camera includes a fixed barrel 11 fixed to a main body (not shown) of the camera, a driving means 100 installed at one side of the fixed barrel 11, and a helicoid ring 12 coupled to the fixed barrel 11 by a first reciprocating means 21 which is moved back and forth according to the rotation by the driving means 100 in forward and reverse directions.

The first reciprocating means 21 includes a female helicoid 21b formed on the inner circumferential surface of the fixed barrel 11 and a male helicoid 21a formed on the outer circumferential surface of an end portion of the helicoid ring 12 toward a film (not shown) and engaged with the female helicoid 21b. A geared portion 101 which is engaged with a gear 102 of the driving means is formed at the same outer circumferential surface of the helicoid ring 12 where the male helicoid 21a is formed. Here, the length of the gear 102 is greater than the length corresponding to the distance of a stroke of the helicoid ring 12 along the optical axis. The gear 102 is installed at a geared motor 103 having a deceleration portion (not shown).

A guide ring 13 linearly moving together with the helicoid ring 12 along the optical axis with respect to the fixed barrel 11 when the helicoid ring 12 moved back and forth by the first guide means 31, is installed inside the ring 12. The helicoid ring 12 and the guide ring 13 are coupled as a first coupling groove 12a, which is circularly formed along the inner circumferential surface of the helicoid ring 12, and a coupling protrusion 13b, which is formed on the outer circumferential surface of the guide ring 13, are coupled to each other.

The first guide means 31 includes at least one first guide groove 31a formed along the optical axis on the inner circumferential surface of the fixed barrel 11 and at least one first guide protrusion 31b formed at the end portion of the guide ring 13 toward the film to be coupled to the first guide groove 31a.

An inner helicoid ring 14 coupled to a second reciprocating means 22 and is rotated by the same rotation angle as the helicoid ring 12 when the inner helicoid ring 14 is reciprocated by a transfer force of the guide ring 13 generated by a second guide means 32, is installed at the guide ring 13.

The second reciprocating means 22 includes a female helicoid 22a formed on the inner circumferential surface of the guide ring 13 and a male helicoid 22b formed on the outer circumferential surface of an end portion of the inner helicoid ring 14 toward the film to a predetermined width to be engaged with the female helicoid 22a. It is obvious that a male helicoid is formed on the inner circumferential surface of the guide ring 13 while a female helicoid is formed on the outer circumferential surface of the inner helicoid ring 14. The second guide means 32 includes at least one second guide groove 32a formed on the inner circumferential surface of the helicoid ring 12, a first escape slit 32b formed to be inclined along the outer circumferential surface of the guide ring 13, and a second guide protrusion 32c formed on the outer circumferential surface of the helicoid ring 14. The second guide protrusion 32c is coupled to the second guide groove 32a by passing through the first escape slit 32b.

A zoom ring 15 at which a front lens group 200 is installed and which is coupled by a third reciprocating means 23, is installed at the inner helicoid ring 14. An inner rotator 16 coupled to the zoom ring 15 and rotated together with the inner helicoid ring 14 by the third guide means 33, is installed at the zoom ring 15. The third reciprocating means 23 includes a female helicoid 23a formed on the inner circumferential surface of the inner helicoid ring 14 and a male helicoid 23b formed on the outer circumferential surface of the zoom ring 15 to have a predetermined width to be engaged with the female helicoid 23a. To engage the inner helicoid ring 14 with the inner rotator 16, the third guide means 33 include at least one third guide groove 33a formed on the inner circumferential surface of the inner helicoid ring 14 and at least one third guide protrusion 33b formed on the outer circumferential surface of the inner rotator 16 to be coupled to the third guide groove 33a. A second escape slit 15a is formed at an end portion of the zoom ring 15 so that the third guide protrusion 33b formed on the outer circumferential surface of the inner rotator 16 coupled to the zoom ring 15 can pass through the second escape slit 15a and guided by the third guide groove 33a. A rotator push 19 coupled to the zoom ring 15 to prevent escape of the inner rotator 16, is installed at the zoom ring 15. The rotator push 19 include a ring type main body and a plurality of hooks 19b coupled to a plurality of second coupling grooves 19c formed on the zoom ring 15 by extending from the main body.

A rear lens group 300 and a rear lens group frame 17, which reciprocates by a rotation force of the inner rotator 16 generated by the cam means 34, are installed inside the inner rotator 16. The cam means 34 includes a cam protrusion 34a formed on the inner circumferential surface of the inner rotator ring 16 and a cam groove 35 formed so as to be inclined on the outer circumferential surface of the rear lens group frame 17 to which the cam protrusion 34a is coupled. The rear lens group frame 17 reciprocates due to the relative movement by the cam groove 35 framed on the outer circumferential surface thereof and an inner guide 18 ring, which will be described later, as the inner rotator 16 rotates in forward and reverse directions. The cam groove 35 includes a receiving portion 35a disposed close to an object to be photographed and an inclined groove portion 35b disposed close to the film by extending from the receiving portion 35a.

The barrel assembly having the above structure includes an inner guide ring 18 which is supported by the guide ring 13 and moves the zoom ring 15 and the rear lens group frame 17 to have a linear trace by preventing rotation of the zoom ring 15 and the rear lens group frame 17 during the zooming of the front and rear lens groups 200 and 300.

Figure 1:
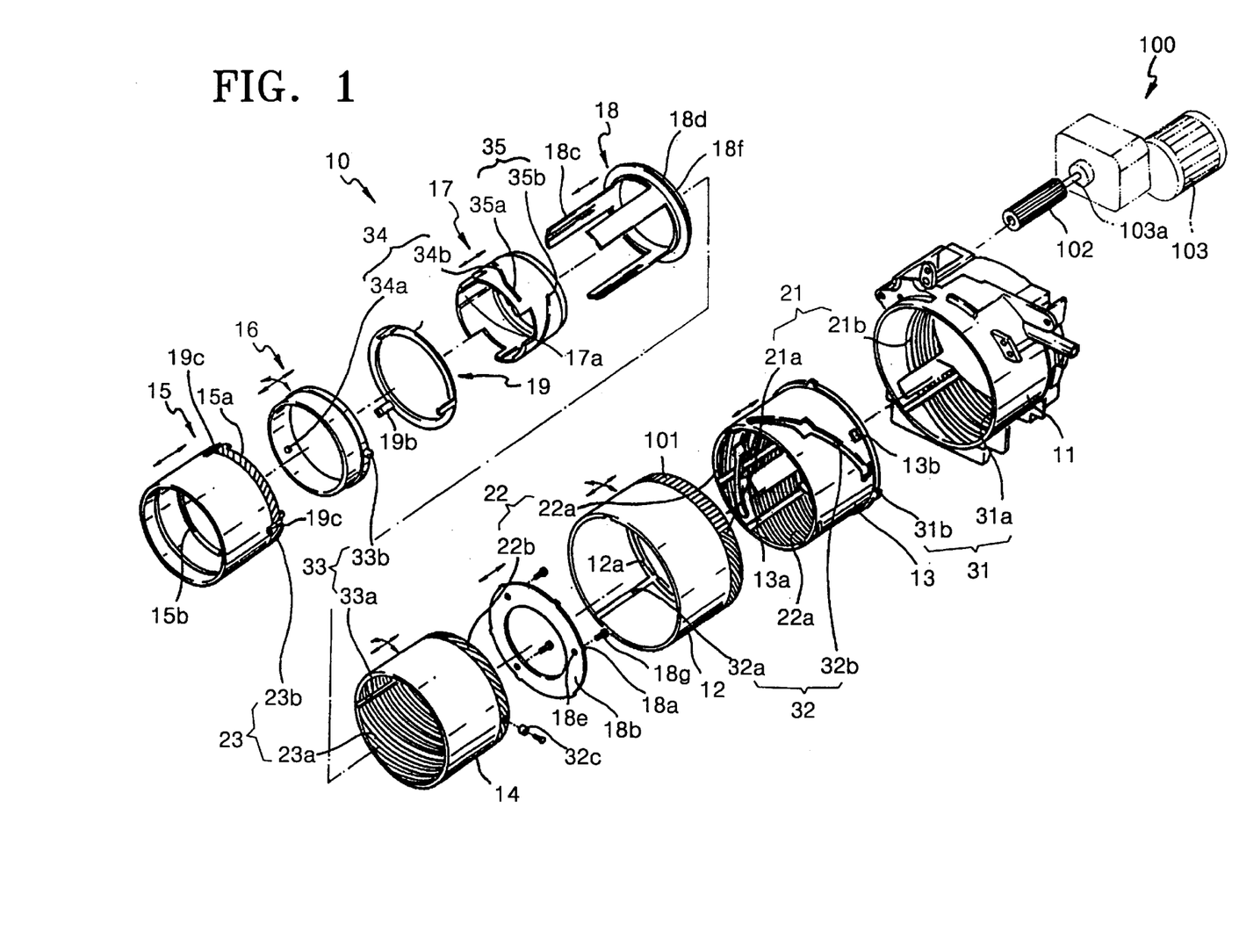
FIG. 1 is an exploded perspective view showing a barrel assembly of a zoom camera according to a preferred embodiment of the present invention.
Figure 2:
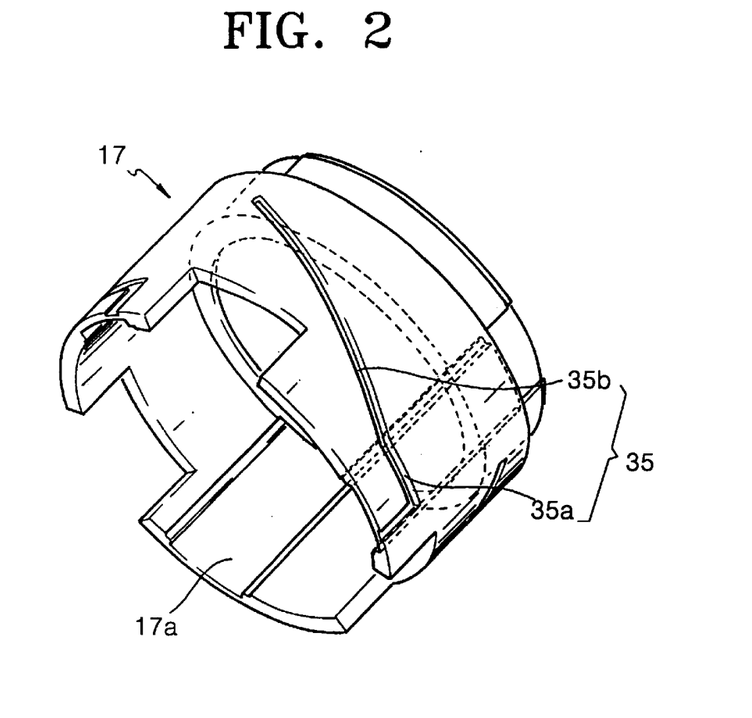
FIG. 2 is a perspective view showing the inner guide ring shown in FIG. 1.
Figure 3:
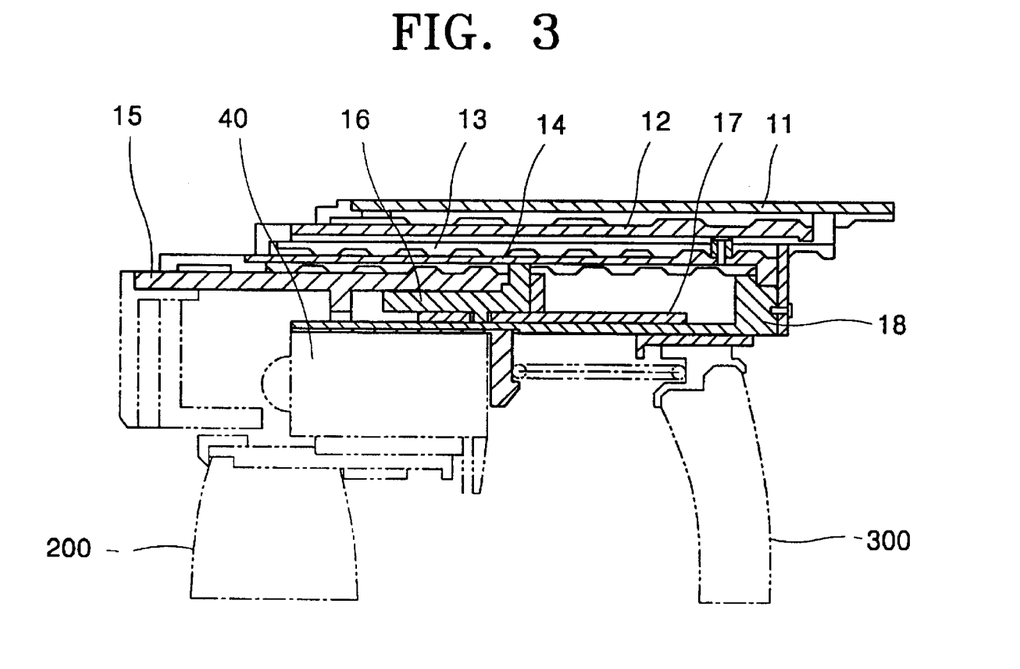
FIG. 3 is a section view of the barrel assembly shown in FIG. 1 in a contracted state.
Figure 4:
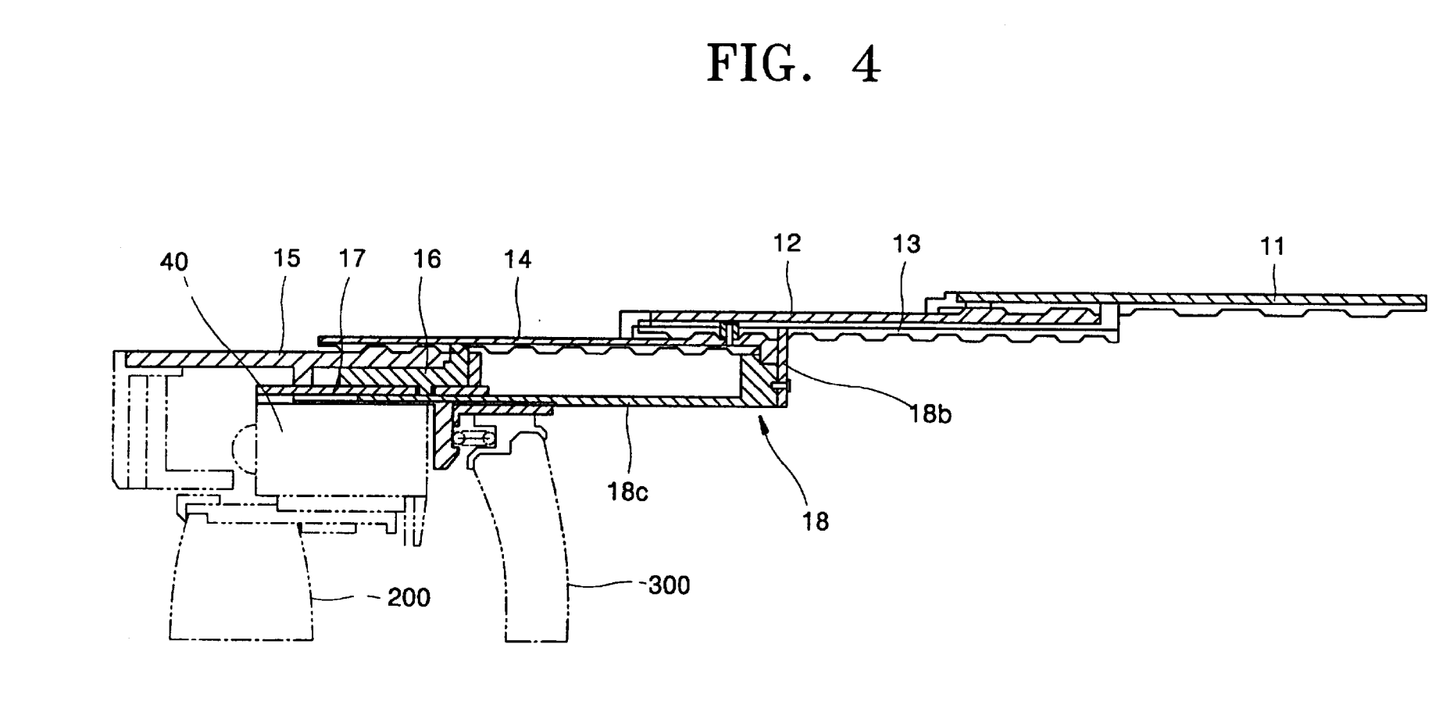
FIG. 4 is a sectional view showing the barrel assembly shown in FIG. 1 in an extended state.
Figure 5:
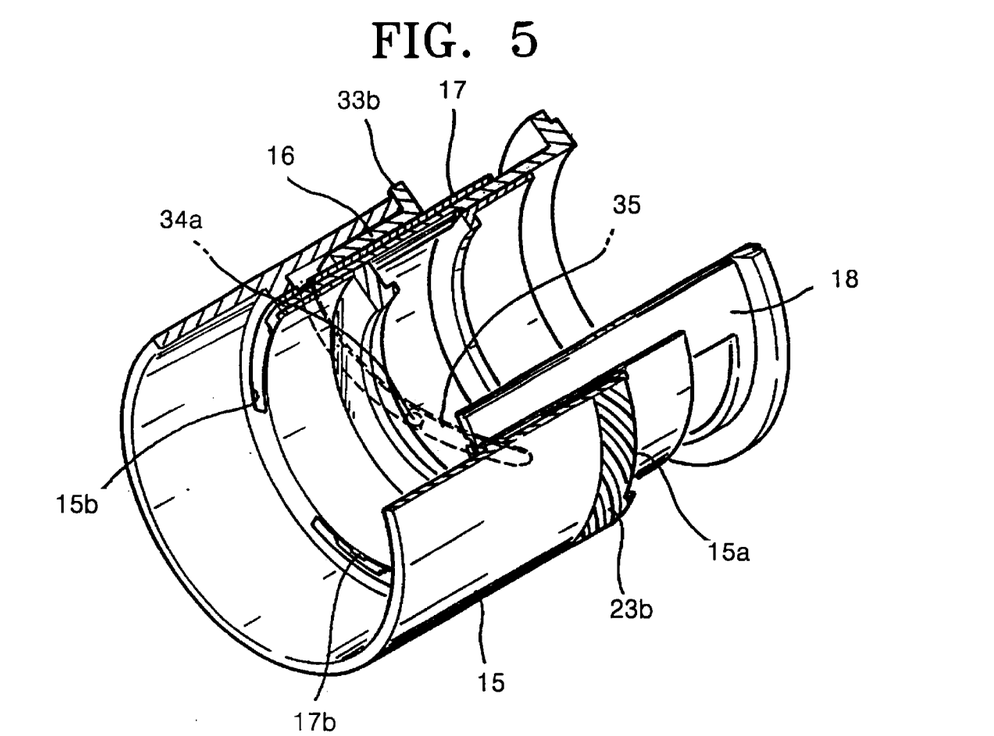
FIG. 5 is a partially cut-away perspective view showing a state in which the zoom ring where the front lens group is installed, the rear lens group frame where the rear lens group is installed, and the inner rotator are coupled to one another according to the present invention.
Figure 6:
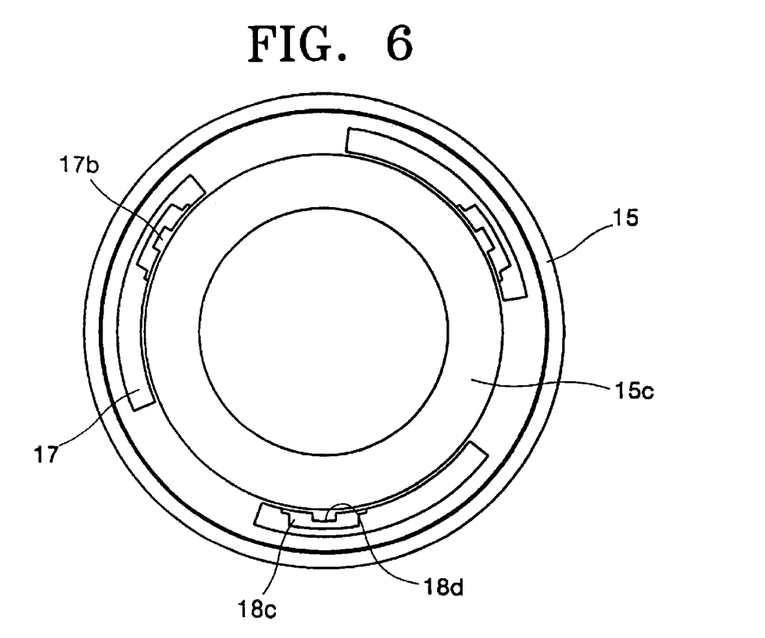
FIG. 6 is a sectional view a state in which the zoom ring, the rear lens group frame and the inner guide ring are coupled to one another.

The inner guide ring 18, as shown in FIGS. 2, 4 and 5, is coupled to the first inner guide ring member 18b having a fifth guide protrusion 18a which is coupled to at least one fifth guide groove 13a formed on the inner circumferential surface of the guide ring 13 along the optical axis, and includes a second inner guide ring member 18d having at least one guide rod portion 18c which is coupled to sixth and seventh guide grooves 17a and 15b formed on the inner circumferential surfaces of the rear lens group frame 17 and the zoom ring 15, respectively. The first inner guide ring member 18b and the inner guide ring 18 are screw-coupled by using set screws. The seventh guide groove 15b formed on the inner circumferential surface of the zoom ring 15, as shown in FIGS. 5 and 6, is formed on a circular threshold formed on the inner circumferential surface of the zoom ring 15. The seventh guide groove 15b is formed such that a portion of the rear lens group frame 17 where the sixth guide groove 17a is formed and the guide rod portion 18c can be coupled. A protrusion 17b coupled to a groove 18d formed on the inner circumferential surface of the guide rod portion 18c, is formed on the inner circumferential surface of the seventh guide groove 15b.

Reference number 40 denotes a shutter block which is installed near the front lens group 200 along the same optical axis as the front and rear lens groups 200 and 300.

In the above-described preferred embodiment, the inner rotator 16 is rotated through the helicoid ring 12, the guide ring 13, and the inner helicoid ring 14 so that the zoom ring 15 where the front lens group 200 is installed and the inner rotator 16 where the rear lens group 300 is installed, but not limited thereto. For example, it is obvious that the inner rotator 16 can be directly driven by a predetermined driving means, and that, if necessary, the inner rotator 16 can be driven by directly coupling the inner helicoid ring 14 and the fixed barrel 11.

In the operation of the barrel assembly having the above structure according to the present invention, when a user selects a telescopic mode, the geared motor 103 of the driving means 100 of the barrel assembly 10 is driven to rotate the helicoid ring 12 engaged with the gear 102 of the geared motor 103. As the helicoid ring 12 rotates, the helicoid ring 12 advances away from the fixed barrel 11. The guide ring 13 installed inside the helicoid ring 12 does not rotate, but linearly moves along the optical axis as the first guide protrusion 31b installed at the outer circumferential surface of the guide ring 12, which is the first guide means 31, moves along the first guide groove 31a formed on the inner circumferential surface of the fixed barrel 11.

In the above process, the inner helicoid ring 14 rotated by the second guide means 32 advances. That is, since the second guide protrusion 32c formed on the outer circumferential surface of the inner helicoid ring 14 is coupled to the second guide groove 32a formed on the inner circumferential surface of the helicoid ring 12 through the first escape slit 32b formed at the guide ring 13, the helicoid ring 12 and the inner helicoid ring 14 are engaged with each other. Also, since the second guide protrusion 32c moves along the first escape slit 32b, the helicoid ring 14 advances away from the guide ring 13 while rotating. As the inner helicoid ring 14 rotates to advance, the third guide protrusion 33b which is the third guide means 33 rotates and moves along the third guide groove 33a formed on the inner circumferential surface of the inner helicoid ring 14. The zoom ring 15 is coupled to the inner helicoid ring 14 since the female helicoid 23a and the male helicoid 23b which are the third reciprocating means are engaged with each other. Since the guide rod portion 18c of the inner guide ring member 18 is coupled to the seventh guide groove 15b formed on the inner circumferential surface of the zoom ring 15, the zoom ring 14 linearly advances parallel to the optical axis.

As the inner rotator 16 rotates, the rear lens group frame 17 installed inside the inner rotator 16 and supported by the cam means 34 linearly advances parallel to the optical axis. That is, the rear lens group frame 17 does not rotate but advances since the inclined groove portion 35b formed on the outer circumferential surface of the rear lens group frame 17 is coupled to the cam protrusion 34a and since the sixth guide groove 17a formed on the inner circumferential surface of the rear lens group frame 17 is coupled to the guide rod portion 18c of the inner guide ring 18. Here, since the fifth guide protrusion 18a is formed on the inner guide ring 18 and since the fifth guide protrusion 18a is coupled to the fifth guide groove 13a formed on the inner circumferential surface of the guide ring 13, the inner guide ring 18 is transferred along the inner circumferential surface of the guide ring 13 according to the movement of the zoom ring 15.

When the user selects a wide mode under the above-described telescopic mode, the geared motor 103 of the driving means 100 reversely rotates and the zoom ring 15 where the front lens group is installed and the rear lens group frame 17 where the rear lens group is installed are moved in the order opposite to the above, so as to be shifted to the wide mode.

As described above, in the barrel assembly according to a preferred embodiment of the present invention, the front lens group and the rear lens group linearly move with respect to the fixed barrel to perform zoom, and focusing is performed by moving the front lens group by the motor installed by the shutter block.

Figure 7:
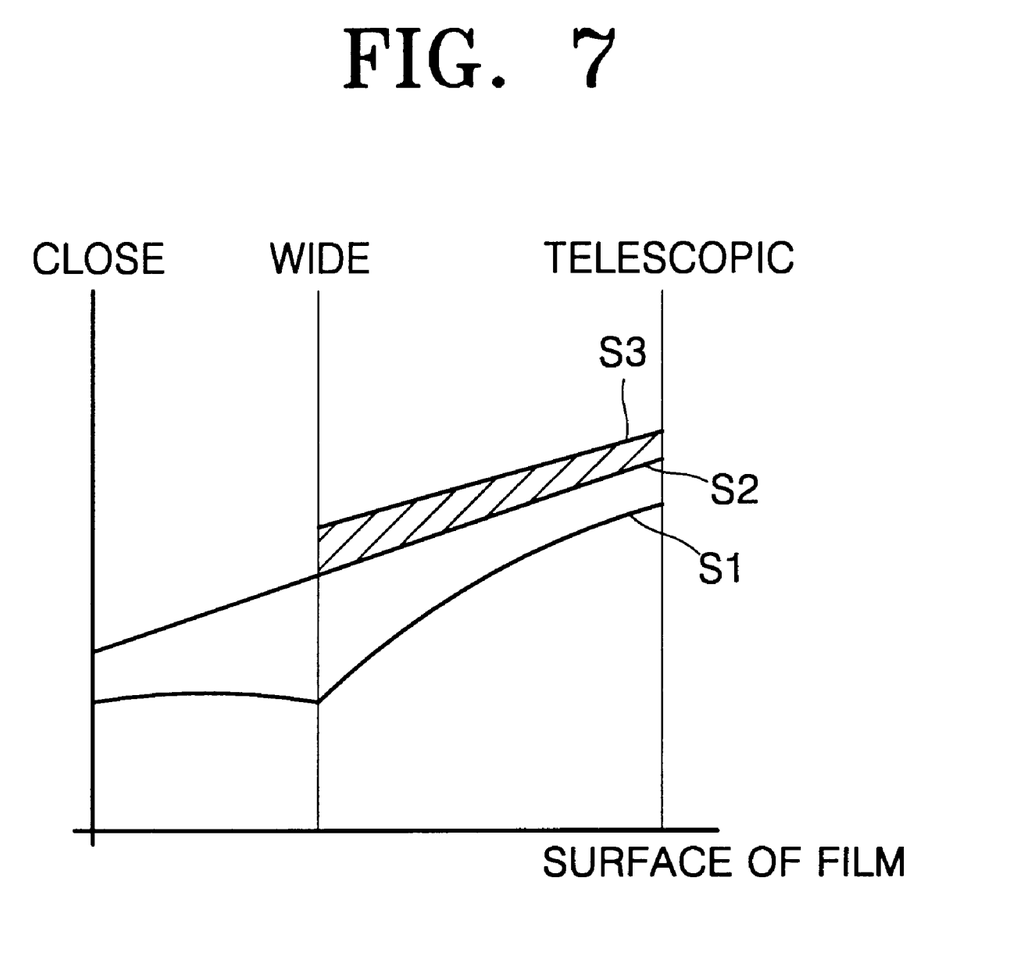
FIG. 7 is a graph showing the trace of distance that the front and rear lend groups move with respect to the surface of a film according to the present invention.

In FIG. 7, S1 denotes the trace of the front lens group and S2 denotes the trace of the rear lens group. Also, S3 denotes focusing performed by the shutter block. As shown in the drawing, since the front and rear lens groups linearly move, unlike the conventional technology, the overload applied to the cam during operation of zoom at the point when the cam curve changes can be prevented.

Thus, compact cameras with high power can be manufactured. A zoom lens in which a curve changing point is not generated when the lens groups are moved can be realized.

What is claimed is:

1. A barrel assembly of a zoom camera having an optical axis comprising:

a zoom ring at which a front lens group is installed and which is moved back and forth along the optical axis;

a rear lens group frame coupled to the zoom ring; and a cam means including a cam groove formed on an outer circumferential surface of the rear lens group frame for correcting an optical position of the rear lens group with respect to the front lens group during a zooming operation, said cam means comprising of an inner rotator rotatably coupled to the zoom ring and a cam protrusion formed on an inner circumferential surface of the inner rotator and coupled to the cam groove formed on the outer circumferential surface of the rear lens group frame.

2. The assembly as claimed in claim 1, further comprising an inner guide ring for guiding the zoom ring and the rear lens group frame when the inner rotator rotates to prevent the zoom ring and the rear lens group frame from rotating while they relatively move.

3. The assembly as claimed in claim 1, wherein the cam groove comprises a receiving portion disposed close to an object to be photographed and an inclined groove portion disposed close to a film.

4. The assembly as claimed in claim 2, wherein the inner guide ring, the zoom ring, and the rear lens group frame are coupled by forming a guide groove on the inner circumferential surface of the rear lens group frame, a circular threshold on the inner circumferential surface of the zoom ring, a guide groove on the circular threshold where a portion where a guide groove of the inner rotator is formed and a guide rod portion of the inner guide ring are coupled, and a protrusion on the inner circumferential surface of the guide groove which is coupled to a groove formed on the inner circumferential surface of the guide rod portion.

5. The assembly as claimed in claim 3, wherein the inner guide ring, the zoom ring, and the rear lens group frame are coupled by forming a guide groove on the inner circumferential surface of the rear lens group frame, a circular threshold on the inner circumferential surface of the zoom ring, a guide groove on the circular threshold where a portion where a guide groove of the inner rotator is formed and a guide rod portion of the inner guide ring are coupled, and a protrusion on the inner circumferential surface of the guide groove which is coupled to a groove formed on the inner circumferential surface of the guide rod portion.

6. The assembly as claimed in claim 1, wherein the cam groove comprises a first portion, and a second portion inclined relative to the first portion.

7. A barrel assembly of zoom camera comprising:
a zoom ring at which a front lens group is installed and which is moved back and forth along an optical axis;
a rear lens group frame at which a rear lens group is installed along the same optical axis as the front lens group and which is coupled to the zoom ring;
a cam means for correcting an optical position of the rear lens group with respect to the front lens group during a zooming operation, the cam means comprising an inner rotator rotatably coupled to the zoom ring and a cam protrusion formed on the inner circumferential surface of the inner rotator so as to be coupled to a cam groove formed on the outer circumferential surface of the rear lens group frame;
an inner guide ring for preventing rotation of the zoom ring and the rear lens group frame when the inner rotator rotates; and
a driving means for rotating the inner rotator in forward and rearward directions.

8. The assembly as claimed in claim 7, wherein the driving means comprises at least one inner helicoid ring rotated by a driving motor in forward and reverse directions and having a guide groove formed on the inner circumferential surface thereof so as to be coupled to a third guide protrusion of the inner rotator.

9. The assembly as claimed in claim 7, wherein the cam groove comprises a receiving portion disposed close to an object to be photographed and an inclined groove portion disposed close to a film.

10. A barrel assembly of a zoom camera having an optical axis comprising:
a fixed barrel fixed to a main body of the zoom camera;
a driving assembly installed at one side of the fixed barrel;
a helicoid ring coupled to the fixed barrel by a first reciprocating assembly so as to be reciprocated according to the rotation of the driving assembly in forward and reverse directions;
a guide ring coupled to the helicoid ring and arranged so as to linearly move together with the helicoid ring by a first guide assembly along the optical axis with respect to the fixed barrel when the helicoid ring is moved back and forth;
an inner helicoid ring coupled to a second reciprocating assembly and arranged so as to be inserted in the guide ring, reciprocated by a transfer force of the guide ring by a second guide assembly, and rotated at the same rate as the helicoid ring;
a zoom ring coupled to the inner helicoid ring by a third reciprocating assembly and where a front lens group is installed;
an inner rotator coupled to the zoom ring and arranged so as to be rotated together with the inner helicoid ring by a third guide assembly arranged to engage an outer circumferential surface of the inner rotator;
a rear lens group frame, where a rear lens group is installed, coupled to the inner rotator and reciprocated by a rotational force of the inner rotator by being guided by a cam assembly; and
an inner guide ring, supported by the guide ring, and configured to prevent the rear lens group frame and the zoom ring from rotating so that the zoom ring and the rear lens group frame can linearly move during a zooming operation of the front and rear lens groups.

11. The assembly as claimed in claim 10, wherein the first guide assembly comprises:
at least one first guide groove formed on the inner circumferential surface of the fixed barrel so as to extend substantially parallel to the optical axis; and
a first guide protrusion formed on the outer circumferential surface of the guide ring so as to be coupled to the first guide groove.

12. The assembly as claimed in claim 10, wherein the second guide assembly comprises:
a second guide groove formed on the inner circumferential surface of the helicoid ring so as to extend substantially parallel to the optical axis;
a first escape slit formed so as to be inclined on the outer circumferential surface of the guide ring; and
a second guide protrusion formed on the outer circumferential surface of the inner helicoid ring so as to be coupled to the second guide groove through the first escape slit.

13. The assembly as claimed in claim 10, wherein the third guide assembly comprises:
a third guide groove formed on the inner circumferential surface of the inner helicoid ring so as to extend substantially parallel to the optical axis; and
a third guide protrusion formed on the outer circumferential surface of the inner rotator so as to be coupled to the third guide groove.

14. The assembly as claimed in claim 10, wherein the inner guide ring comprises:
   a first inner guide ring member having a fifth guide protrusion coupled to at least one fifth guide groove formed on the inner circumferential surface of the guide ring so as to extend substantially parallel to the optical axis; and
   a second inner guide ring member coupled to the first inner guide ring member and having at least one guide rod portion coupled to sixth and seventh guide grooves formed on the inner circumferential surfaces of the rear lens group frame and the zoom ring, respectively.

15. The assembly as claimed in claim 14, wherein the first and second inner guide ring members are integrally formed.

16. The assembly as claimed in claim 10, wherein the cam assembly comprises:
   a cam protrusion formed on the inner circumferential surface of the inner rotator; and
   a cam groove formed on the outer circumferential surface of the rear lens group frame so as to be coupled to the cam protrusion.

17. The assembly as claimed in claim 16, wherein the cam groove comprises:
   a receiving portion disposed close to an object to be photographed; and
   an inclined portion disposed close to a film.

18. The assembly as claimed in claim 10, wherein each of the first, second, and third reciprocating assemblies comprises a female helicoid and a male helicoid engaged with the female helicoid.

19. The assembly as claimed in claim 10, wherein the cam assembly comprises a cam groove formed on an outer circumferential surface of the rear lens group frame.

20. The assembly as claimed in claim 19, wherein the cam groove comprises a first portion, and a second portion inclined relative to the first portion.

21. The assembly as claimed in claim 10, wherein the third guide assembly includes a protrusion formed on an outer circumferential surface of the inner rotator and arranged to engage a groove formed on an inner circumferential surface of the inner helicoid ring.

22. The assembly as claimed in claim 21, wherein the cam assembly comprises a protrusion formed on an inner circumferential surface of the inner rotator and arranged to engage a groove extending around an outer circumferential surface of the rear lens group frame.

23. A barrel assembly of a zoom camera having an optical axis comprising:
   a fixed barrel fixed to a main body of the zoom camera and having a guide groove formed on an inner circumferential surface so as to extend substantially parallel to the optical axis;
   a driving assembly installed at one side of the fixed barrel;
   a helicoid ring coupled to the fixed barrel by a first reciprocating assembly so as to be reciprocated according to the rotation of the driving assembly in forward and reverse directions and having a second guide groove extending substantially parallel to the optical axis;
   a guide ring coupled to the helicoid ring and having a first cam groove formed on the outer circumferential surface thereof and a first guide protrusion formed at one end portion thereof to be coupled to the first guide groove, the guide ring being linearly reciprocated along a direction substantially parallel to the optical axis with respect to the fixed barrel when the helicoid ring is rotated in forward and reverse directions;
   an inner helicoid ring coupled to the guide ring and a third reciprocating assembly and having a second guide protrusion formed on an outer circumferential surface thereof so as to be coupled to the second guide groove through the first cam groove;
   a zoom ring coupled to the inner helicoid ring by a third reciprocating assembly and where a front lens group is installed;
   an inner rotator coupled to the zoom ring and having a third guide protrusion formed on an outer circumferential surface thereof so as to be coupled to a third guide groove formed on an inner circumferential surface of the inner helicoid ring, and a cam protrusion formed on an inner circumferential surface of the inner rotator;
   a rear lens group frame where a lens group is installed, and having a cam groove formed on the outer circumferential surface thereof which is coupled to the cam protrusion; and
   an inner guide ring supported by the guide ring and arranged to prevent the rear lens group frame and the zoom ring from rotating so that the zoom ring and the rear lens group frame can linearly move along the optical axis by a rotational force of the helicoid ring during a zooming operation.

24. The assembly as claimed in claim 23, wherein the cam groove comprises:
   a receiving portion disposed close to an object to be photographed; and
   an inclined portion disposed close to a film.

25. The assembly as claimed in claim 23, wherein each of the first, second, and third reciprocating assemblies comprises a female helicoid and a male helicoid engaged with the female helicoid.

26. The assembly as claimed in claim 23, wherein the inner guide ring comprises:
   a first inner guide ring member having a fifth guide protrusion coupled to at least one fifth guide groove formed on the inner circumferential surface of the guide ring so as to extend substantially parallel to the optical axis; and
   a second inner guide ring member coupled to the first inner guide ring member and having at least one guide rod portion coupled to a sixth and a seventh guide groove formed on the inner circumferential surfaces of the rear lens group frame and the zoom ring, respectively.

* * * * *